Patented Sept. 27, 1927.

1,643,428

UNITED STATES PATENT OFFICE.

HEINRICH TESCHE AND ALBERT JOB, OF ELBERFELD, NEAR COLOGNE, GERMANY, ASSIGNORS TO GRASSELLI DYESTUFF CORPORATION, OF NEW YORK, N. Y., A CORPORATION OF DELAWARE.

ANTHRAQUINONE-NITROSAMINE COMPOUND.

No Drawing. Application filed October 12, 1925, Serial No. 82,155, and in Germany October 24, 1924.

We have found new and useful improvements in anthraquinone-nitrosamine compounds of which the following is a clear and exact specification.

It is well known that the action of nitrites and even nitroso compound in presence of acids upon anthraquinone or its derivatives leads to oxidation products. According to the German Patent 251,845, Example #1 a bluish-violet vat dyestuff is obtained constituting a diphenyl derivative, or oxidation product of two 1-anilido-anthraquinone molecules, when nitrosodimethylaniline is allowed to react upon 1-anilido-anthraquinone in solution of concentrated sulfuric acid at low temperature. It has furthermore been disclosed in German Patents 81.245; 162,792; 163,041; 249,938 that hydroxyl derivatives are obtained by the action of nitrites in sulfuric acid solution upon anthraquinone and its derivatives.

We have now found that the action of nitrous acid compounds, such as alkali metal nitrites, ethylnitrite, amylnitrite, etc., upon N-substituted aminoanthraquinones can be so directed as to produce N-nitrosamineanthraquinone bodies of the general formula—

in which R is an organic radicle, preferably an alkyl, aralkyl, or aryl radicle, e. g. methyl: —CH$_3$; benzyl: —CH$_2$—C$_6$H$_5$; phenyl: —C$_6$H$_5$; tolyl: —C$_6$H$_4$—CH$_3$ etc. The term nitrous acid compound as used herein is meant to comprise the nitrosation agents mentioned above, i. e., nitrous acid, its salts and esters. The reaction proceeds in the presence or absence of a diluent, in solution of a mineral acid such as not too concentrated sulfuric acid or hydrochloric acid, or of an organic acid such as glacial acetic acid at a temperature below about 40° C. Alpha as well as beta alkyl-, aralkyl- or aryl-aminoanthraquinone compounds are suitable for our new reaction. The anthraquinone nucleus can itself be substituted in any desired manner.

Our new anthraquinone-nitrosamine compounds are generally yellow colored crystalline products, soluble in sulfuric acid with a yellow color, soluble in sulfuric acid containing phenol, with a green color, showing a characteristic absorption spectrum, consisting of a sharp line in the red end of the spectrum. It is possible to obtain same in substantially pure condition by recrystallization from pyridine.

Our new nitrosamines have proven valuable compounds in the production of intermediates and dyestuffs.

In order to further illustrate our invention the following examples are given:

1. 1 part 1-methylaminoanthraquinone is dissolved in 20 parts hot glacial acetic acid. Sodium nitrite is added to the still hot solution until the color of the solution is a light yellow. Water is now added cautiously and the nitrosamine separates practically quantitatively as beautiful light yellow colored needles. It has most probably the formula

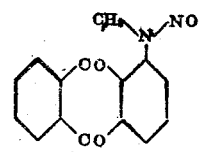

It can be recrystallized from pyridine. It is soluble in sulfuric acid with a yellow, in phenol-sulfuric acid with a green color; the latter solution shows an absorption spectrum consisting of a sharp line in the red part of the spectrum. This nitrosamine is easily decomposed at higher temperature by acids, reducing agents and even when heated to higher temperature in organic solvents; the nitroso group is split up in these reactions.

2. 1 part 1-methylaminoanthraquinone is dissolved in 15 parts 80% sulfuric acid, and a slight excess over the theoretical amount of sodium nitrite added. The reaction is finished as soon as a drop of the solution when poured into water does not produce any more a red coloration. The reaction mass is then drowned in water and the yellow crystalline nitroso compound separates. It is identical with the product obtained in Example 1.

The same product is also obtained if the methylaminoanthraquinone is dissolved in hydrochloric acid and sodium nitrite allowed to react upon it.

3. 1 part 1-anilido-anthraquinone is dissolved hot in 50 parts glacial acetic acid. After cooling to room temperature sodium nitrite is added, the nitrosation proceeds and the color of the solution turns yellow. After a short while the nitroso compound separates as light yellow colored leaflets. The yield is nearly quantitative.

The nitroso compound which has most probably the formula

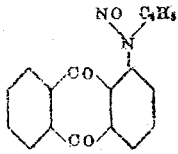

is soluble in sulfuric acid with a yellow color and with a green color in phenol-sulfuric acid. The later solution shows a distinct absorption line in the red end of the spectrum.

4. 1 part 1-benzylaminoanthraquinone is dissolved in 20–30 parts glacial acetic acid, and sodium nitrite is added until the color of the solution becomes yellow. The reaction mass is diluted with water and the nitroso compound separates substantially pure as yellow crystalline clusters. It has most probably the formula

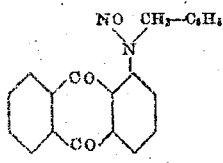

It is soluble in sulfuric acid with a yellow color and in phenol-sulfuric acid with a green color, which shows an absorption spectrum consisting of a line in the red end of the spectrum.

5. 1 part 2-methylaminoanthraquinone is dissolved in 15–20 parts glacial acetic acid; while hot sodium nitrite is added until the orange color of the solution changes to yellow. The nitroso compound separates on dilution as beautiful light yellow colored needles. It has most probably the formula

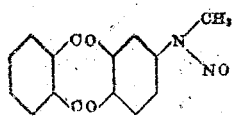

It is soluble in sulfuric acid as well as in organic solvents with yellow to brownish-yellow color. Solutions in phenol-sulfuric acid are green and show a distinct absorption line in the red end of the spectrum. This N-nitroso-2-methylaminoanthraquinone is relatively stable in concentrated sulfuric acid and organic solvents, even at higher temperature.

6. 1 part 2-p-toluidoanthraquinone is dissolved in as little glacial acetic acid as possible and sodium nitrite added until the color of the solution has changed to yellow. On dilution with water the nitrosamine separates. It forms light greenish-yellow crystals, having most probably the formula

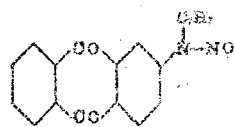

It is soluble in organic solvents and in sulfuric acid with a yellow, in phenol-sulfuric acid with a green color. The latter shows an absorption spectrum consisting of a line in the red end of the spectrum.

7. 1 part 2-benzylaminoanthraquinone is dissolved in glacial acetic acid and sodium nitrite added until the solution turns yellow. The nitrosamine crystallizes on solution with water. Recrystallized from pyridine it forms light yellow colored needles having most probably the formula

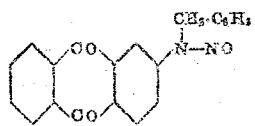

It is soluble in organic solvents and in sulphuric acid with a yellow color, in phenol-sulphuric acid with a green color, showing a distinct absorption line in the red end of the spectrum.

We claim:—

1. The process of producing an anthraquinonenitrosamine compound of the general formula

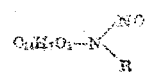

in which R is an alkyl, aralkyl or aryl radicle, which comprises reacting with a nitrous acid compound, at a temperature below about 40° C., upon an N-substituted aminoanthraquinone compound of the general formula

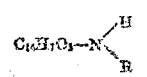

in which R is an alkyl, aralkyl or aryl radicle.

2. The process of producing an anthraquinonenitrosamine compound of the general formula

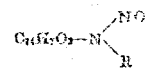

in which R is an alkyl, aralkyl or aryl radicle, which comprises reacting in an acid medium with a nitrous acid compound, at a temperature below about 40° C., upon an N-substituted aminoanthraquinone compound of the general formula

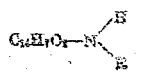

in which R is an alkyl, aralkyl or aryl radicle.

3. The process of producing an anthraquinonenitrosamine compound of the general formula

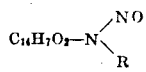

in which R is an alkyl, aralkyl or aryl radicle, which comprises reacting, at a temperature below about 40° C., in solution of glacial acetic acid, with a nitrous acid compound upon an N-substituted amino-anthraquinone compound of the general formula

in which R is an alkyl, aralkyl or aryl radicle.

4. The process of producing an anthraquinonenitrosamine compound of the general formula

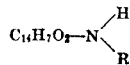

in which R is an alkyl, aralkyl or aryl radicle, which comprises reacting at a temperature below about 46° C., in an acid medium with an alkali-metal nitrite upon an N-substituted amino-anthraquinone compound of the general formula

in which R is an alkyl, aralkyl or aryl radicle.

5. The process of producing N-nitroso-2-methylaminoanthraquinone having most probably the formula

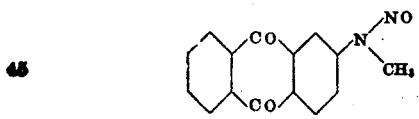

which comprises reacting, at a temperature below about 40° C. with a nitrous acid compound upon 2-methylamino-anthraquinone.

6. The process of producing N-nitroso-2-methylamino-anthraquinone which comprises reacting at a temperature below about 40° C. with a nitrous acid compound in an acid medium upon 2-methylamino-anthraquinone.

7. The process of producing N-nitroso-2-methylamino-anthraquinone which comprises reacting, at a temperature below about 40° C., in solution of glacial acetic acid with a nitrous acid compound upon 2-methylamino-anthraquinone.

8. The process of producing N-nitroso-2-methylamino-anthraquinone which compr ses reacting at a temperature below about 40° C., in solution of glacial acetic acid with an alkali metal nitrite upon 2-methylamino-anthraquinone.

9. As new products anthraquinone-nitrosamine compounds of the general formula

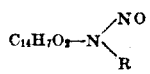

in which R stands for an alkyl, aralkyl or aryl radicle, which are yellow colored crystalline bodies, soluble in organic solvents and in sulfuric acid with a yellow color and soluble in phenol-sulfuric acid with a green color, which shows a distinct absorption line in the red end of the spectrum.

10. As new products anthraquinone-2-nitrosamine compounds of the general formula

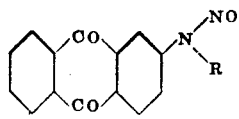

in which R stands for an alkyl, aralkyl or aryl radicle, which are yellow colored crystalline bodies, soluble in organic solvents and in sulfuric acid with a yellow color and soluble in phenol-sulfuric acid with a green color showing a distinct absorption line in the red end of the spectrum.

11. As a new product N-nitroso-2-methylamino-anthraquinone having most probably the formula

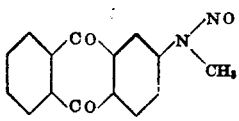

which forms light yellow colored crystalline needles, soluble in organic solvents and in sulfuric acid with a yellow to yellowish brown color, soluble in phenol-sulfuric acid with a green color showing a distinct absorption line in the red end of the spectrum and which is relatively stable to higher temperatures when dissolved in organic solvents or concentrated sulfuric acid.

In testimony whereof we have hereunto set our hands.

HEINRICH TESCHE.
ALBERT JOB.